United States Patent
Marginean et al.

(10) Patent No.: US 12,505,056 B2
(45) Date of Patent: Dec. 23, 2025

(54) COMMUNICATING BETWEEN HETEROGENOUS ENDPOINTS OF AN ELECTRONIC SYSTEM VIA GENERALIZED DATA MESSAGING

(71) Applicant: Textron Systems Corporation, Hunt Valley, MD (US)

(72) Inventors: Titus Marcel Marginean, Reisterstown, MD (US); Brandon Yunginger, Red Lion, PA (US); Stephen Cassedy, Freeland, MD (US); Steven Beck, Hanover, PA (US)

(73) Assignee: Textron Systems Corporation, Hunt Valley, MD (US)

( * ) Notice: Subject to any disclaimer, the term of this patent is extended or adjusted under 35 U.S.C. 154(b) by 54 days.

(21) Appl. No.: 18/320,639

(22) Filed: May 19, 2023

(65) Prior Publication Data
US 2024/0385982 A1   Nov. 21, 2024

(51) Int. Cl.
*G06F 13/10* (2006.01)
*G06F 13/36* (2006.01)

(52) U.S. Cl.
CPC .......... *G06F 13/36* (2013.01); *G06F 2213/40* (2013.01)

(58) Field of Classification Search
CPC .............................. G06F 13/36; G06F 2213/40
See application file for complete search history.

(56) References Cited

U.S. PATENT DOCUMENTS

| | | | |
|---|---|---|---|
| 6,665,594 B1 | 12/2003 | Armstrong | |
| 6,873,886 B1 | 3/2005 | Mullen et al. | |
| 7,428,412 B2 | 9/2008 | Wright et al. | |
| 7,581,072 B2 | 8/2009 | Tsai et al. | |
| 7,669,209 B2 | 2/2010 | Inohara et al. | |
| 7,684,904 B2 | 3/2010 | Wainwright et al. | |
| 8,195,151 B2 | 6/2012 | Cerra, II et al. | |
| 8,918,540 B2 * | 12/2014 | Corman | H04L 69/08 708/204 |

(Continued)

FOREIGN PATENT DOCUMENTS

| | | |
|---|---|---|
| CN | 110488851 | 11/2019 |
| CN | 114648223 A * | 6/2022 |

(Continued)

OTHER PUBLICATIONS

The International Search Report and the Written Opinion of the International Searching Authority, for application No. PCT/US20024/025427, dated Jul. 19, 2024, 13 pages.

(Continued)

*Primary Examiner* — Cheng Yuan Tseng
(74) *Attorney, Agent, or Firm* — BainwoodHuang (57) ABSTRACT

A technique for communicating between multiple endpoints of an electronic system includes providing a common interface component for each endpoint. Each common interface component is configured to translate between endpoint-specific messages of a respective endpoint and generalized messages that are not specific to any endpoint. Using this arrangement, any two endpoints can communicate via generalized messages, by translating endpoint-specific messages of a sender into generalized messages and by translating generalized messages into endpoint-specific messages of a receiver.

19 Claims, 4 Drawing Sheets

(56) References Cited

U.S. PATENT DOCUMENTS

| | | | |
|---|---|---|---|
| 9,088,613 | B2 | 7/2015 | Wahler |
| 9,135,036 | B2 | 9/2015 | Upton |
| 9,699,249 | B2 | 7/2017 | Hristov |
| 9,723,091 | B1 | 8/2017 | Krock et al. |
| 9,826,039 | B2 | 11/2017 | Goldstein et al. |
| 9,875,200 | B2 | 1/2018 | Huber et al. |
| 9,981,740 | B2 | 5/2018 | Dunkelberger et al. |
| 10,416,967 | B2 | 9/2019 | Ogasawara |
| 10,761,914 | B2 | 9/2020 | Kielstra et al. |
| 11,272,008 | B2 * | 3/2022 | Osawa ................ H04L 45/38 |
| 11,714,614 | B2 * | 8/2023 | Witte .................... G06F 9/48 |
| | | | 717/136 |
| 11,741,093 | B1 * | 8/2023 | Lagadapati ...... G06F 16/24553 |
| | | | 707/769 |
| 12,047,255 | B2 * | 7/2024 | Miller ................ H04L 69/08 |
| 2022/0019597 | A1 * | 1/2022 | Takagi ................ G06F 16/25 |
| 2022/0415184 | A1 | 12/2022 | Summer et al. |
| 2023/0389093 | A1 * | 11/2023 | Balmakhtar .......... H04W 76/12 |
| 2024/0106537 | A1 * | 3/2024 | Soryal ............ H04B 10/25759 |
| 2024/0111263 | A1 * | 4/2024 | Namburi .............. G05B 19/042 |

FOREIGN PATENT DOCUMENTS

| | | | | |
|---|---|---|---|---|
| CN | 109308224 | B | * 7/2022 | ............ G06F 9/541 |
| CN | 116368355 | A | * 6/2023 | |
| EP | 784268 | | 5/2000 | |
| WO | WO-2023200425 | A1 | * 10/2023 | ....... G06F 15/17343 |

OTHER PUBLICATIONS

Marques, Mario Monteiro; "STANAG 4586—Standard Interfaces of UAV Control System (UCS) for NATO UAVE Interoperability", Command and Control Interface (CCI), Human Computer Interface Specific Module, Jan. 5, 2015 (Jan. 5, 2015), XP055374091, Retrieved from the internet: URL:https://www.sto.nato.int/publications/STO%20Educational%20Notes/STO-EN-SCI-271/EN/SCI-271-03.pdf [retrieved on May 18, 2017], the whole document.

Marginean, Marcel-Titus, et al., "sDOMO-A Simple Communcation Protocol for Home Automation and Robotic Systems", Computer Science, Technology and Application pp. 151-160, Mar. 2016.

Marginean, Marcel-Titus, et al., "sDOMO Communication Protocol for Home Robotic Systems in the Context of the Internet of Things", Computer and Information Sciences, Published in 2015 IEEE International Conference on Technologies for Practical Robot Applications (TePRA), 10 pages, Aug. 27, 2015.

* cited by examiner

COMMUNICATING BETWEEN HETEROGENOUS ENDPOINTS OF AN ELECTRONIC SYSTEM VIA GENERALIZED DATA MESSAGING

BACKGROUND

Many electronic systems include heterogenous components that are not natively designed to communicate with one another. For example, an electronic system for operating, testing, and/or simulating a UAV (unmanned aerial vehicle) may include the UAV itself as well as various other components, such as a payload controller, an autopilot command center, a pilot controller, and a flight status utility, some of which may be local to the UAV and some of which may be remote. Such components communicate using their own respective interfaces and protocols, but some interfaces and protocols may not be compatible with those of other components.

To enable heterogenous components to communicate, custom interfaces may be developed for each pair of components between which communication is desired. For example, a first custom interface may be designed for allowing an autopilot command center to control a UAV. Likewise, a second custom interface may be designed for allowing a flight status utility to collect status data from a payload controller.

SUMMARY

Unfortunately, providing a custom interface for each pair of components in an electronic system can be inflexible and technologically complex. The same component may include multiple custom interfaces for communicating with different other components, proliferating the amount of code and sometimes hardware that must be designed and supported. Further, changes in interface components, even minor changes, may require recompiling a large code base. If the code base is subject to compliance checks, such as to meet safety requirements, any small change may require extensive recertification. Such recertification can be costly and time consuming. What is needed, therefore, is a more flexible and simpler way of enabling communication between heterogenous components.

In contrast with the above-described prior approach, an improved technique for communicating between multiple endpoints of an electronic system includes providing a common interface component for each endpoint. Each common interface component is configured to translate between endpoint-specific messages of a respective endpoint and generalized messages that are not specific to any endpoint. Using this arrangement, any two endpoints can communicate via generalized messages, by translating endpoint-specific messages of a sender into generalized messages and by translating generalized messages into endpoint-specific messages of a receiver.

Advantageously, the improved technique avoids proliferation of interfaces, as only a single interface may be needed for each endpoint, e.g., for translating between endpoint-specific messages of that endpoint and generalized messages, which form a common base for supporting communications with other endpoints. In addition, the common interface component may be common across all endpoints, reducing the amount of code that must be created, maintained, and (if necessary) certified. In an example, specific tailoring of common interface components for respective endpoints may be achieved using data provided outside any compiled code base, such as in one or more configuration files. Thus, many if not all desired changes in the behavior of a common interface component of a particular endpoint can be achieved without any changes in compiled code.

Certain embodiments are directed to a method of communicating between a plurality of endpoints of an electronic system. The method includes providing a respective common interface component for each of the plurality of endpoints, and configuring each respective common interface component to translate between endpoint-specific messages of the respective endpoint and generalized messages that are not endpoint-specific. The method further includes providing an endpoint-specific message of a first endpoint to a second endpoint at least in part by (i) translating, by the common interface component of the first endpoint, the endpoint-specific message of the first endpoint to a set of generalized messages, (ii) providing the set of generalized messages to the common interface component of the second endpoint, and (iii) translating, by the common interface component of the second endpoint, the set of generalized messages to a set of endpoint-specific messages of the second endpoint.

Other embodiments are directed to a method of controlling an aerial vehicle using an electronic system. The method includes translating an endpoint-specific message of a first endpoint of the electronic system into a set of generalized messages, the first endpoint disposed outside the aerial vehicle. The method further includes storing the set of generalized messages in a database and sending the set of generalized messages from the database to a second endpoint of the electronic system, the second endpoint disposed within the aerial vehicle and controlling at least a portion of the aerial vehicle in real time responsive to the message.

Other embodiments are directed to a computerized apparatus constructed and arranged to perform either of the methods described above. Still other embodiments are directed to a computer program product. The computer program product stores instructions which, when executed on control circuitry of a computerized apparatus, cause the computerized apparatus to perform either of the methods described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein. regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles but are not intended to be limiting.

An improved technique of communicating between multiple endpoints of an electronic system includes providing a common interface component for each endpoint. Each common interface component is configured to translate between endpoint-specific messages of a respective endpoint and generalized messages that are not specific to any endpoint. Using this arrangement, any two endpoints can communicate via generalized messages, by translating endpoint-specific messages of a sender into generalized messages and by translating generalized messages into endpoint-specific messages of a receiver.

Figure 1:
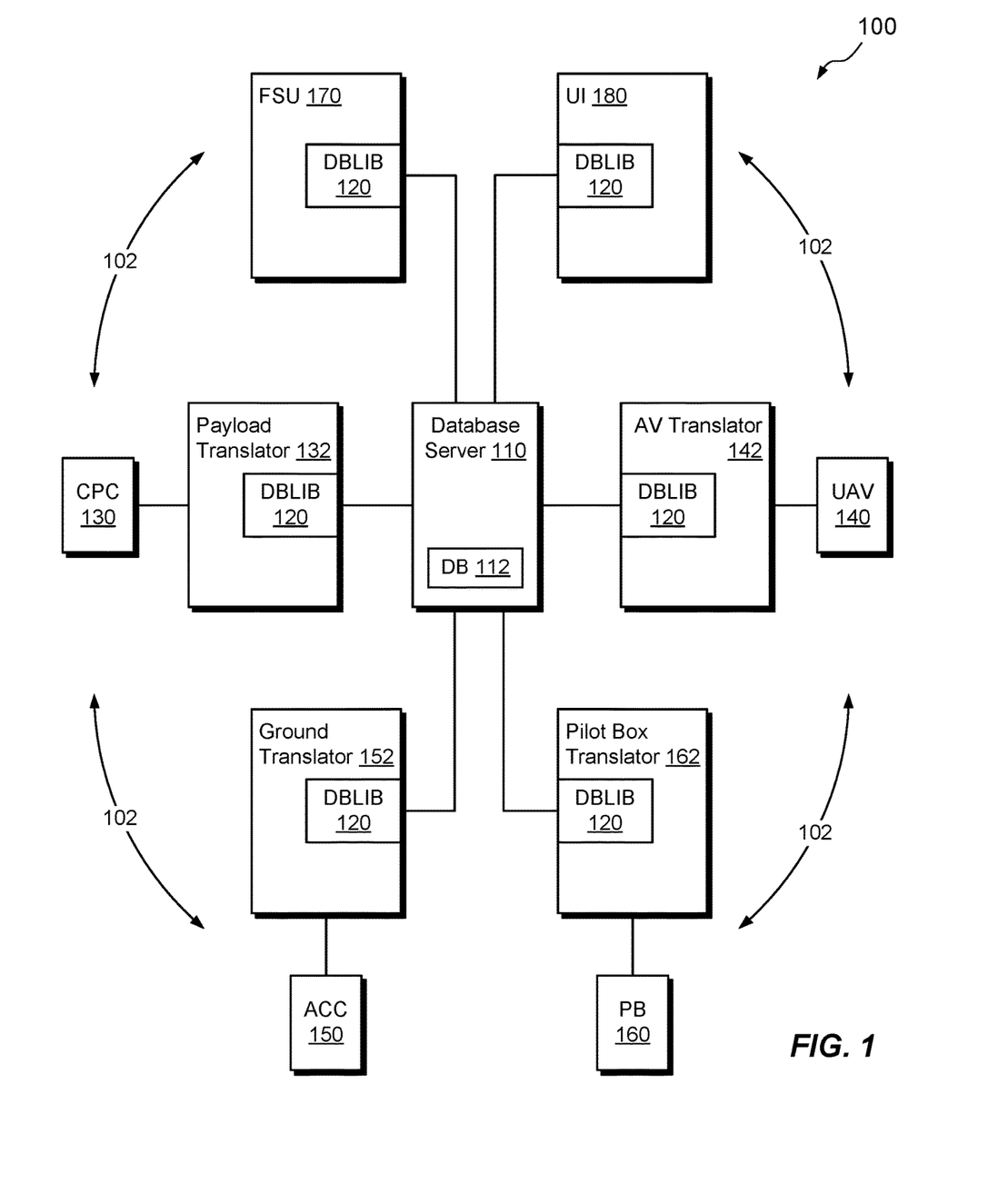
FIG. 1 is a block diagram of an example environment in which embodiments of the improved technique can be practiced.

FIG. 1 shows an example environment 100 in which embodiments of the improved technique can be practiced. Here, multiple endpoints 102 are configured in a star configuration around a central information hub, such as a database server 110 having a database 112. The endpoints 102 may include, for example, a common payload controller (CPC) 130, an unmanned aerial vehicle (UAV) 140, an autopilot command center (AAC) 150, a pilot box (PB) 160, and a flight status utility (FSU) 170. Such endpoints may be configured to control the UAV 140 during flight, e.g., in real time, to simulate or test the UAV, or to simulate or test other endpoints. The depicted endpoints 102 are merely examples and are not intended to be limiting. In some examples, a user interface (UI) 180 may itself be provided as an endpoint, for enabling administrators to configure and manage the database server 110 and other components.

As shown, each of the endpoints 102 is associated with a respective common interface component 120, referred to herein as "DBLIB." In an example, DBLIB is a compiled software component that is common across all endpoints 102, meaning that a respective instance of the same component may be provided with each endpoint 102. The instances of DBLIB are configured to translate between endpoint-specific messages of the respective endpoints and generalized messages, which are endpoint-agnostic and not specific to any endpoint. In an example, each instance of DBLIB runs on a computer having one or more processors and memory. The processor(s) and memory form control circuitry, which is constructed and arranged to perform the various methods and procedures attributed herein to the DBLIB instances. In some examples, the various DBLIB instances may be provided on respective computers. In other examples, multiple DBLIB instances, including all of them in some cases, may be provided on the same computer.

Each instance of DBLIB may be configured specifically for use with a respective endpoint. For example, the instance of DBLIB provided with the CPC 130 may be configured specifically for use with the CPC 130, the instance of DBLIB provided with the UAV 140 may be configured specifically for use with the UAV 140, and so on. As instances of DBLIB are preferably identical across all endpoints 102, endpoint-specific behaviors of DBLIB instances are preferably achieved based on external data, such as endpoint-specific configuration files or other data.

Some instances of DBLIB may be provided with associated translators. For example, the instance of DBLIB associated with the CPC 130 may operate in connection with a payload translator 132. Likewise, the instances of DBLIB associated with the UAV 140, ACC 150, and PB 160 may operate in connection with an AV (aerial vehicle) translator 142, a ground translator 152, and a pilot box translator 162, respectively. Each such translator is constructed and arranged to provide a physical interface to the respective endpoint. For example, a translator may be configured to provide voltage level shifting and/or time formatting for enabling digital communications with the associated DBLIB instance. The translator may further be configured to perform data extraction, e.g., by removing headers and/or footers or other metadata from endpoint-specific messages, such that payloads of the message may be provided as binary data. Such binary data may then be provided to the respective DBLIB instance in a uniform format that DBLIB is configured to recognize. Translators also enable data transfer from DBLIB instances to the respective endpoints, e.g., by adding headers, footers, or other metadata and thereby packaging messages for transfer to respective endpoints. Although DBLIB instances 120 may be the same for different endpoints 102, translators are typically endpoint-specific, as they provide direct physical interfaces. Translators may be realized, for example, using hardware, firmware, software, or any combination thereof. As translators typically perform a limited role of extracting message payloads and packaging payloads into messages, their designs are expected to remain stable over time such that realizing translators using hardware, firmware, or compiled code is not likely to result in costly or expensive redesigns.

Some instances of DBLIB may be provided without translators. For example, the FSU 170 and UI 180 may be realized entirely as software components, which run on the same computer (or computer network) as the respective DBLIB instance. In such examples, the endpoint (FSU or UI) may communicate with the respective DBLIB instance via an API (Application Program Interface), without the need for a translator.

The various components of FIG. 1 may be co-located or physically distributed in any suitable manner. Some components may be located in the UAV 140, which may be on the ground or in flight. Other components may be located at one or more ground stations, which may be configured to communicate, e.g., wirelessly, with the UAV 140 and associated components. Appropriate communication circuitry, antennas, and the like, may be provided as needed (omitted from the figure for simplicity). In a particular example, translators 132, 142, 152, and 162, along with their respective DBLIB instances, may be co-located with the database server 110.

The arrangement of FIG. 1 enables communication among the various endpoints 102 using generalized messages as a common base. For example, a sender endpoint, such as the CPC 130, may send an endpoint-specific message of the CPC to a receiver endpoint, such as the UAV 140. The DBLIB instance of the CPC may facilitate this end by rendering the endpoint-specific message of the CPC as a set of generalized messages, and then effectuating transmission of the set of generalized messages to the UAV 140. The DBLIB instance of the UAV then translates the set of generalized messages into one or more endpoint-specific messages of the UAV. In an example, transmission of messages may employ the database server 110 as an information hub and intermediary through which messages are passed.

Figure 2:
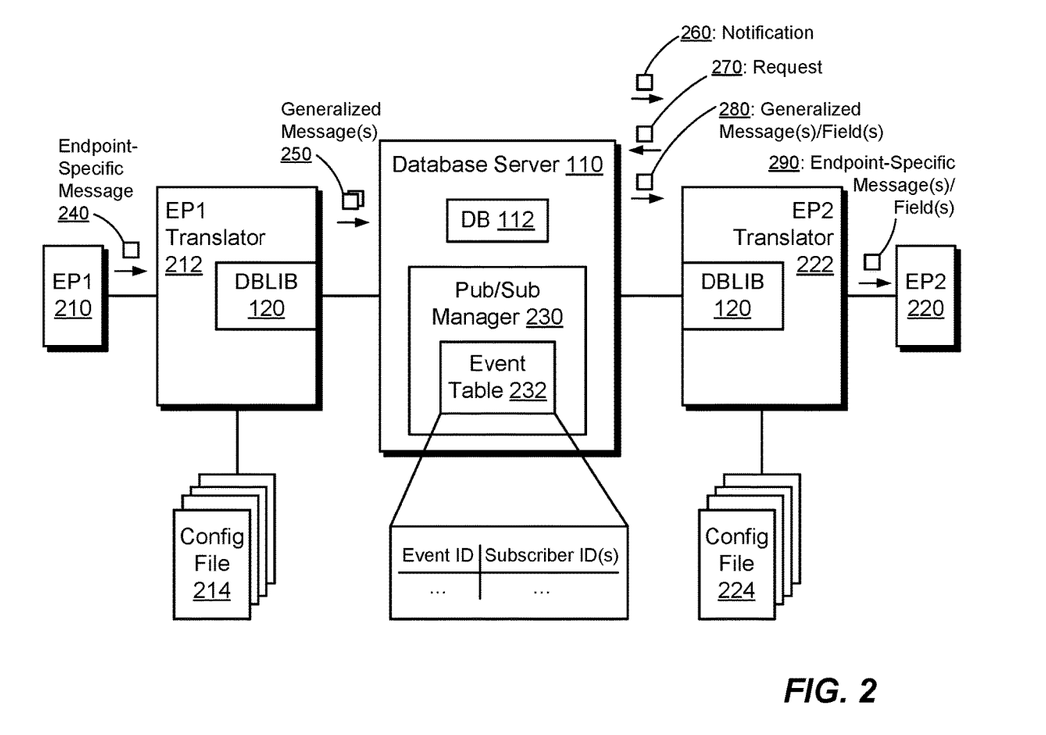
FIG. 2 is a block diagram of an example communication between two endpoints of FIG. 1.

FIG. 2 shows an example of additional aspects of message transmission between endpoints in the environment 100 of FIG. 1. Here, a first endpoint, EP1 (210), attempts to send a message 240 to a second endpoint, EP2 (220). EP1 and EP2 may be any two endpoints 102, such as any of the endpoints shown in FIG. 1. The message 240 is endpoint-specific to EP1, meaning that the message has a format and content specific to EP1. For example, EP1 may have its own predefined message types and field types, which may be specific to EP1 but not used by one or more other endpoints in the environment 100. The message 240 is produced by EP1 and may be received by an EP1 translator 212, which operates in connection with an instance of DBLIB 120. The EPI translator (but not the DBLIB instance) may be omitted where direct API communication is used. EP1 translator 212 processes the message 240 and produces binary data, e.g., with any header, footer, or other metadata removed, and the translator provides the binary data to the local instance of DBLIB.

The DBLIB instance of EP1 translates the endpoint-specific message 240 into a set of generalized messages 250, which are endpoint-agnostic. For example, the DBLIB instance parses the binary data of message 240 into individual fields. It may further convert the message 240 into multiple generalized messages. In an example, the database 112 is configured to store generalized messages and fields in a format that is user-friendly to programmers, engineers, and administrators. Providing user-friendly data may involve translating individual endpoint-specific messages to multiple generalized messages, which may provide information at a finer level of granularity than do the endpoint-specific messages. For example, generalized messages may be more numerous than corresponding endpoint-specific messages and they may include fewer fields per message.

In an example, the local DBLIB instance for EP1 is configured specifically for use with EP1 by a set of configuration files 214. For instance, the DBLIB instance of EPI may read the configuration files 214, or any subset of them, into local memory upon startup, and configure its own operation based on configuration data contained in the files 214. In this manner, the configuration files 214 tailor the operation of the DBLIB instance for the particular endpoint. In an example, the configuration files 214 define translations between endpoint-specific messages and corresponding generalized messages and thereby enable the DBLIB instance both to translate endpoint-specific messages to generalized messages, and to translate generalized messages to endpoint-specific messages.

Once the DBLIB instance for EP1 has translated the endpoint-specific message 240 to the set of generalized messages 250, the DBLIB instance sends the set of generalized messages 250 to the database server 110. The database server 110 receives the set of generalized messages 250 and proceeds to store each such message in the database 112. In some examples, different fields of the set of messages 250 are stored in respective fields of the database 112.

In an example, the database server 110 sends generalized messages 150 to receiver endpoints using a publish/subscribe (pub/sub) model. For example, the database server 110 includes a pub/sub manager 230, which is constructed and arranged to alert subscribing endpoints of changes in messages and/or their respective fields. For example, when receiving the set of generalized messages 250 from the DBLIB instance of EP1, the database server 110 may also receive a set of event descriptors that describe messages and/or fields that are being changed. In an example, the pub/sub manager 230 maintains a set of data structures, such as an event table 232, which associates event descriptors of events with corresponding subscribers to those events. Event descriptors may be identified by associated event IDs, which uniquely identify events, and subscribers may be identified by associated subscriber IDs, which uniquely identify endpoints 102 that are subscribers to those events.

For this example, we assume that the event table 232 indicates that endpoint EP2 is the sole subscriber to events associated with the set of messages 250. In an example, the pub/sub manager 230 sends a notification 260 to this subscriber, e.g., to the DBLIB instance associated with EP2, alerting the DBLIB instance that an event (or multiple events) has occurred. For example, the notification 260 may include the received event descriptors. The DBLIB instance of EP2 may then respond to the notification 260 by sending a request 270 for the indicated data to the database server 110. The database server 110 may then respond by providing data 280, which contains the updated messages and/or fields. The DBLIB instance of EP2 receives the data 280 and translates the associated messages and/or fields to corresponding endpoint-specific messages and/or fields 290, which are then provided (e.g., via EP2 translator 222) to EP2. EP2 then receives the translated messages in its own, endpoint-specific format.

Endpoint EP2 has its own set of configuration files 224, which perform a similar function as files 214 but are arranged for configuring EP2. Thus, the common DBLIB component of EP2 is configured particularly for use with EP2, just as the common DBLIB component of EP1 is configured specifically for use with EP1.

Although the example of FIG. 2 assumes only one subscriber to the set of generalized messages 250, one should appreciate that any number of endpoints 102 may be subscribers, via their respective DBLIB instances. In such cases, the DBLIB instance of each subscriber would receive its own notification 260, provide its own request 270, and receive back its own data 280, which would then be translated to the appropriate endpoint-specific message(s) and provided to the respective endpoint.

In an example, the database 112 is optimized for high-speed, deterministic performance such that it is capable of supporting real-time control over endpoints, including real-time control over the UAV 140 in flight. A suitable example of the database 112 includes an in-memory key-value store, which may associate keys (e.g., message IDs and/or field IDs) with associated values of those messages and/or fields. In an example, the database 112 stores values in an array indexed by key, such that values can be obtained from the array with constant, deterministic access times. Persistent databases may also be used, but in-memory solutions have been found to be adequate, if not preferable, particularly because the database 112 stores most of its content only transiently, e.g., just long enough to transfer received data to subscribing endpoints. Also, the database 112 preferably supports dual lookup, which achieves O(1) complexity with respect to the number of messages.

Figure 3:
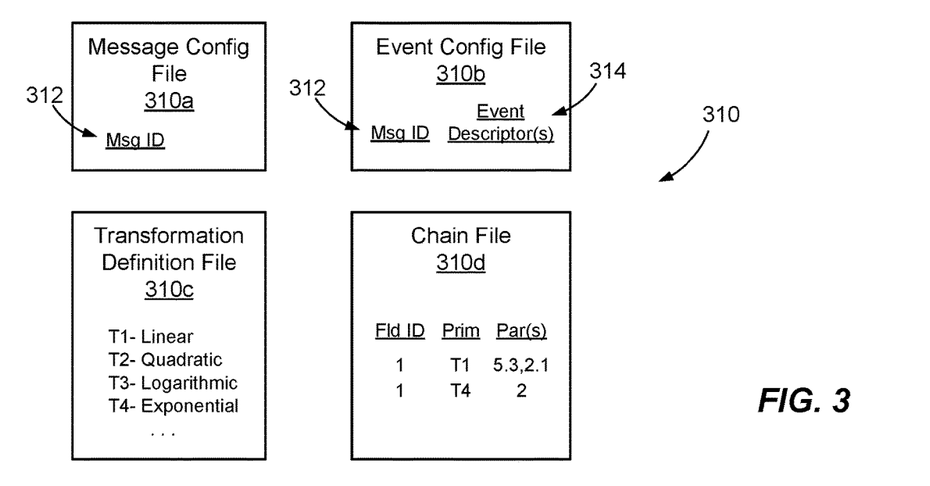
FIG. 3 is a block diagram of example configuration files that may be used in the embodiments of FIGS. 1 and 2.

FIG. 3 shows examples of configuration files 310, which are intended to be representative of the configuration files 214 and 224 of FIG. 2. Four configuration files are shown: a message configuration file 310a, an event configuration file 310b, a transformation definition file 310c, and a chain file 310d. Additional or fewer configuration files may be used. Also, multiple instances of certain configuration files may be provided, such as multiple message configuration files 310a (e.g., one per message), multiple event configuration files 310b (one per event), and so forth. The example shown is intended merely to be illustrative.

In an example, the message configuration file 310a defines endpoint-specific messages and fields, generalized messages and fields, and translations (e.g., mappings) between endpoint-specific and generalized messages and fields. Endpoint-specific messages and generalized messages may have associated message IDs 312. Each message configuration file 310a may be provided, for example, as an XML file, which may be generated from an associated ICD (interface control document) for the respective endpoint. The XML file may be generated from the ICD manually, e.g., by a programmer, or automatically, e.g., by a function supported by the database server 110 and controlled by the UI 180. In an example, the DBLIB instance for a particular endpoint reads the XML file into memory, e.g., at system startup. The DBLIB instance may instantiate software classes (e.g., C++ classes) for representing the XML-defined constructs. This arrangement enables the DBLIB instance to translate messages based on the message configuration file 310a at sufficient speed to enable real-time performance. One should appreciate that the use of message configuration files based on ICD data limits the creation of generalized messages to only those messages for which developers have created ICD data (e.g., only those messages that developers understand and have tested). Thus, the use of message configuration files provides an additional benefit of enhancing safety, which is critical for controlling aerial vehicles in flight.

A message configuration file may also be referred to herein as an "Endpoint ICD." In some examples, information about generalized messages (a "Database ICD") may be stored in the database 112 and downloaded to an endpoint upon startup of that endpoint. In such cases, translating between endpoint-specific messages and generalized messages may involve an endpoint accessing both (i) the configuration files (including the Endpoint ICD) and (ii) the Database ICD obtained from the database 112. Also, various tools may be provided herein for automating the generation of endpoint ICDs. For example, such tools may automatically create, e.g., using Microsoft Word documents as input, basic XML files, also referred to herein as "stubs." Such stubs may require little or no editing to provide corresponding message configuration files.

In an example, the event configuration file 310b defines events associated with generalized messages and/or fields defined in the message configuration file 310a. Examples of events may include, for example, things like "new altitude" or "new flap position," and thus define changes that may be relevant to other endpoints, which may subscribe to those events. As an example, the event configuration file 310b arranges information based on message IDs 312 (e.g., identifiers of generalized messages) and associated event descriptors 314, which identify the events to be raised in connection with sending the corresponding messages. In an example, the event descriptors 314 are designated by unique event IDs. For instance, when the DBLIB instance of EPI sends a generalized set of messages 250 to the database server 110 (FIG. 2), it may obtain the associated message IDs 312, check the local event configuration file 310b for the event descriptors 314 associated with those message IDs 312, and include those descriptors 314 in the transmission.

The pub/sub manager 320 of the database server 110 may then receive the event descriptors 314 and look up the event IDs provided with the event descriptors 314. The pub/sub manager 320 may identify the endpoints 102 that subscribe to those events, thereafter notifying (260) the endpoints and sending (280) the associated updates. In general, events may be triggered by the writing a message in the database. As a result, one or more messages are read from database and sent to whichever endpoints subscribe to them.

The transformation definition file 310c and the chain file 310d may be used together to define data transformations between fields of endpoint-specific messages 240 and corresponding fields of generalized messages 250. For example, the transformation definition file 310c defines primitives, such as linear transformation (T1), quadratic transformation (T2), logarithmic transformation (T3), exponential transformation (T4), and the like. The primitives may take parameters. For example, the linear primitive T1 may accept one parameter for slope and another parameter for y-intercept. The chain file 310d defines, for particular transformations, sequences of instantiated primitives and parameter values (e.g., source and/or target message fields) associated with the primitive(s) in each sequence. One chain file 310d may be provided for each field transformation, or one chain file 310d may be provided for all field transformations, e.g., with different field transformations identified using field identifiers or other means.

In the example shown, a chain file 310d for transforming a particular field may specify a first primitive T1 (linear) to be applied to the particular field using the indicated parameters (5.3 and 2.1). The chain file 310d may further specify a second primitive T4 (exponential) primitive to be applied after the first primitive is applied, using the indicated parameter (2). By using primitives, arbitrarily complex transformations can be achieved. Although arithmetic operations are specifically shown, primitives may also include string-based primitives and/or primitives affecting other data types. Many transformations may be simple. Preferably, field values of generalized messages 250 are standardized to MKS (meter-kilogram-second) units. Thus, many transformations may involve only a single primitive for converting linearly between units, such as between feet and meters. One should appreciate that transformations may be applied both for converting fields of endpoint-specific messages 240 to corresponding fields of generalized messages 250 and for converting fields of generalized messages 250 to corresponding fields of endpoint-specific messages 240.

In an example, each DBLIB instance reads the transformation definition file 310a (or multiple such files) into memory, e.g., at startup, and represents individual primitives using software classes, such as C++ classes. The software classes may be arranged in an array, such that realizing a transformation in a chain file 310d may involve merely providing a vector of pointers into the array along with associated parameters. In this manner, transformations can be achieved with minimal delay, thereby promoting fast and deterministic processing.

As an example, an endpoint-specific message 240 may include a field value for altitude, which may be expressed in units of feet above ground level (AGL). However, the corresponding generalized message(s) 250 may express altitude in units of meters above mean sea level (MSL). To transform this field value, a first linear primitive may be used to convert feet to meters, and a second linear primitive may be used to convert meters AGL to meters MSL.

FIGS. 4-7 show example methods 400, 500, 600 and 700 that may be carried out in connection with the environment 100. The various acts of methods 400, 500, 600 and 700 may be ordered in any suitable way. Accordingly, embodiments may be constructed in which acts are performed in orders different from those illustrated, which may include performing some acts simultaneously.

Figure 4:
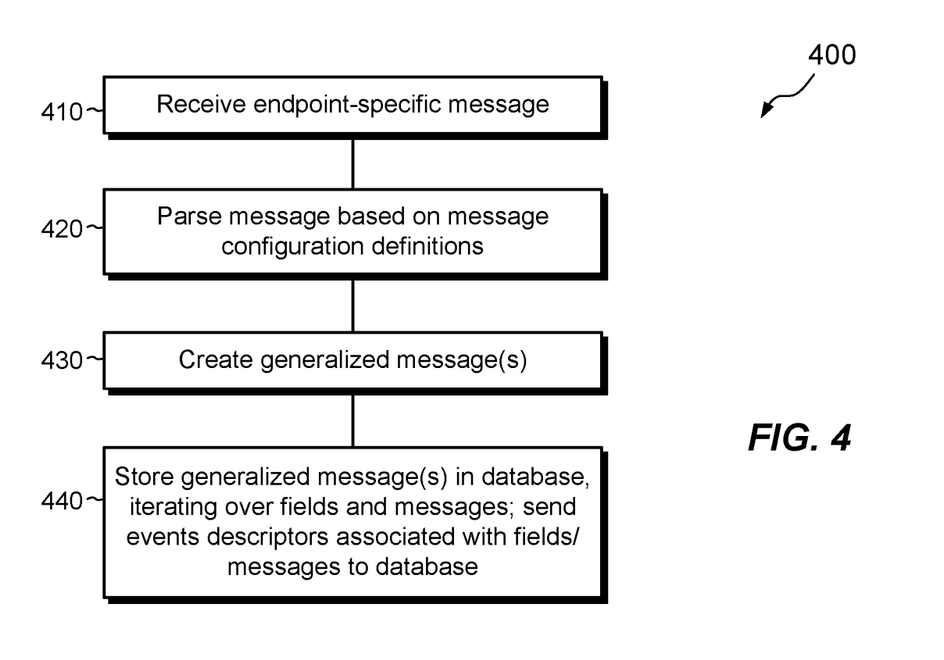
FIG. 4 is a flowchart showing an example method of translating an endpoint-specific message from an endpoint into a set of generalized messages.

FIG. 4 shows an example method 400 of translating an endpoint-specific message 240 from an endpoint 102 into a set of generalized messages 250. The method 400 may be performed, for example, by the DBLIB instance 120 of the endpoint that is sending a message, such as EP1 in FIG. 2.

At 410, the DBLIB instance for an endpoint 102 (e.g., EP1) receives an endpoint-specific message 240 from the endpoint. Receiving the endpoint-specific message 240 may include pre-processing the message 240 by an associated translator (e.g., translator 212), which renders the message as binary data, e.g., by removing any header, footer, and/or other metadata.

At 420, the DBLIB instance parses the endpoint-specific message 240 based on message definitions, e.g., those provided in an associated message configuration file 310a. Such parsing may involve identifying a message ID associated with the message, identifying fields of the message and associated field values, and identifying mappings between the indicated endpoint-specific message/fields and the corresponding generalized message(s)/fields.

At 430, the DBLIB instance creates a set of generalized messages 250 that corresponds to the endpoint-specific message 240. For example, the DBLIB instance of EP1 applies a message configuration file 310a to map the endpoint-specific message 240 and field(s) into the set of generalized messages 250 and associated field(s).

At 440, the DBLIB instance stores the set of generalized messages 250 in the database 112, e.g., by forming and sending instructions to update database fields provided for the generalized message(s) and field(s) in the database 112. In some examples, the DBLIB instance also sends event descriptors 314 that specify events associated with the message(s) and field(s) being sent.

Figure 5:
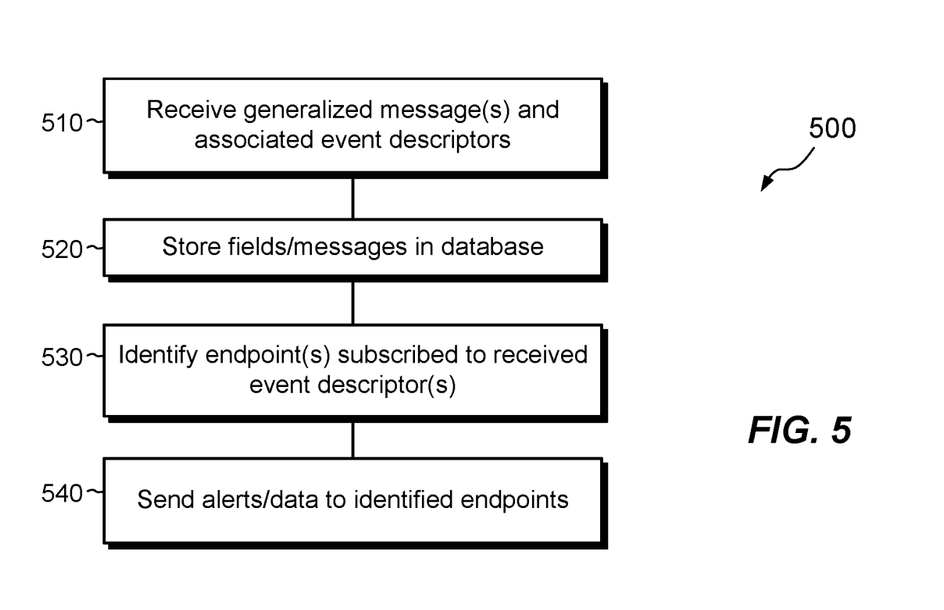
FIG. 5 is a flowchart showing an example method of receiving and processing generalized messages for transmission to message receivers.

FIG. 5 shows an example method 500 of receiving and processing generalized messages 250 for transmission to message receivers. The method 500 is typically performed, for example, by the database server 110.

At 510, the database server 510 receives a set of generalized messages 250 from the DBLIB instance of a message-sending endpoint. The received set of generalized messages 250 may include, for example, associated message IDs and/or field IDs, which correspond, for example, to keys in the key-value store of the database 112. The received message(s) 250 may further include a set of event descriptors 314 that specify events to be raised in connection with updates to values of key-value pairs in the database 112.

At 520, the database server 110 updates the database 112 to reflect the changed values. For example, the database server 110 updates one or more key-value pairs in the database 112 to reflect updated message and/or field values.

At 530, the database server 110 identifies endpoints 102 that subscribe to the changed values. For example, the database server 110 identifies event IDs specified by the received event descriptors 314 and identifies subscribers associated with those event IDs from the event table 232.

At 540, the database server 110 sends a notification 260 to each subscribing endpoint. For instance, the database server 110 sends each notification 260 as a push notification. In an example, each subscribing endpoint calls back by sending a request 270 for the new value(s). The database server 110 receives the request(s) 270 and responds by sending the requested data 280, e.g., the set of generalized messages and/or field values.

Figure 6:
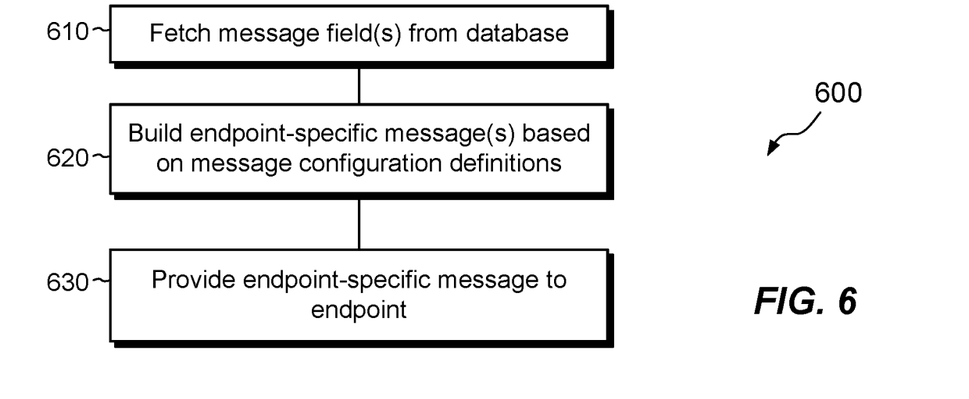
FIG. 6 is a flowchart showing an example method of translating a set of generalized messages into a set of endpoint-specific messages.

FIG. 6 shows an example method 600 of translating a set of generalized messages 280 into a set of endpoint-specific messages 290. The method 600 is typically performed, for example, by the DBLIB instance of each subscribing endpoint, such as that of EP2 in the example of FIG. 2.

At 610, the DBLIB instance of the receiving endpoint (EP2), having received a notification 260, fetches the set of generalized messages 280 from the database server 110, e.g., as part of a request 270 or multiple such requests. The set of generalized messages 280 may be received altogether, one field at a time, or in any other suitable manner.

At 620, the DBLIB instance of EP2 builds a set of endpoint-specific messages 290 corresponding to the set of generalized messages 280. Such building is based on mappings, which are defined, for example, in a message configuration file 310a provided for the endpoint EP2.

At 630, the DBLIB instance of EP2 provides the endpoint-specific message(s) 290, including any updated field values, to the endpoint EP2. For example, the DBLIB instance of EP2 creates binary data corresponding to the endpoint-specific message(s) 290. If a translator 222 is needed, this step may further include packaging the binary data by providing any necessary header, footer, or other metadata. It may further include level shifting and/or providing time formatting, such that the endpoint EP2 can properly receive the binary data. EP2 then receives the endpoint-specific message(s) 290 and responds to such message(s) according to its own programming.

Figure 7:
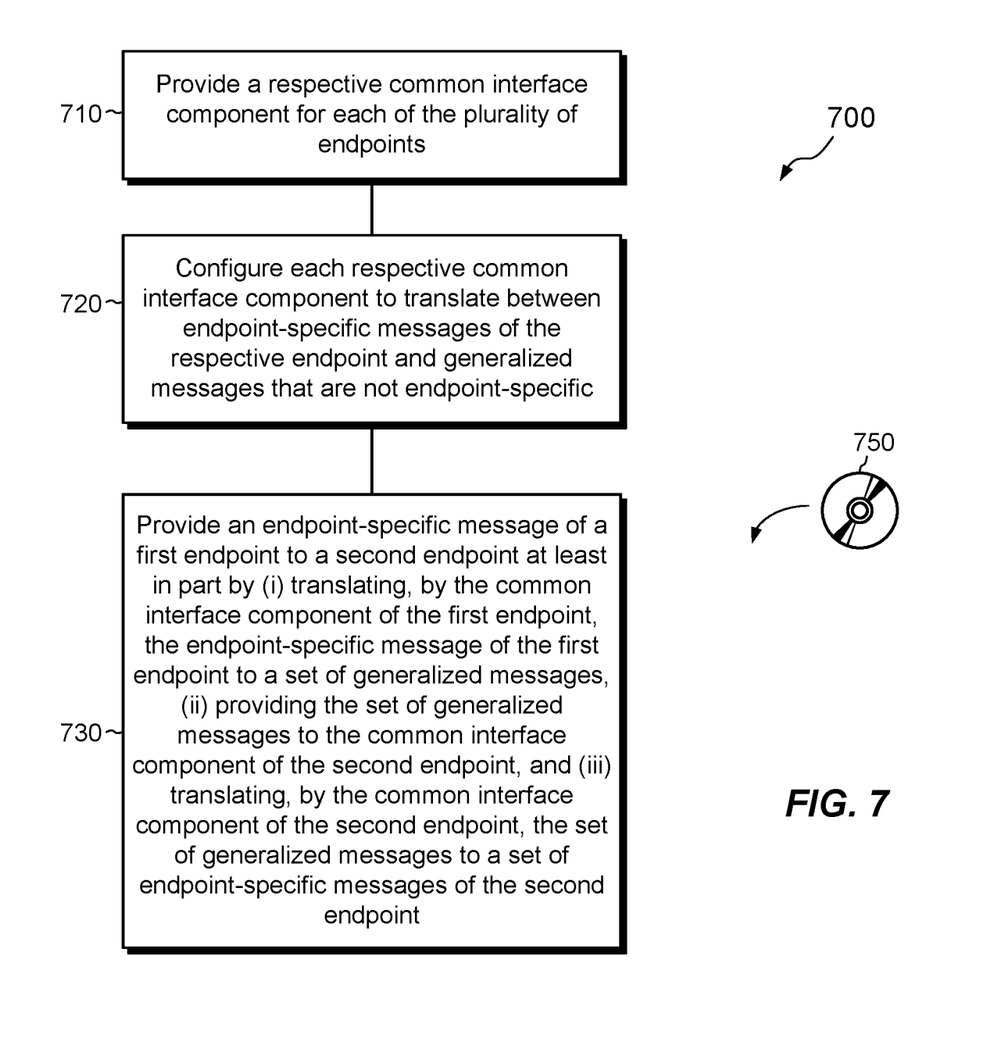
FIG. 7 is a flowchart showing an example method of communicating between a plurality of endpoints of an electronic system.

FIG. 7 shows an example method 700 of communicating between a plurality of endpoints 102 of an electronic system 100 and provides a summary of certain features described above. The method 700 is typically performed, for example, by the components shown in FIG. 1, which may include the depicted DBLIB instances 120 of the depicted endpoints 102 and the database server 110.

At 710, a respective common interface component 120, such as a respective DBLIB instance, is provided for each of the plurality of endpoints 102. For example, instances of DBLIB may be installed on one or more computers, with each instance providing an interface between the respective endpoint 102 and the database server 110.

At 720, each respective common interface component 120 is configured to translate between endpoint-specific messages 240 of the respective endpoint 102 and generalized messages 250 that are not endpoint-specific. For example, the DBLIB instance of each endpoint 102, or any number of endpoints, may receive configuration data, e.g., from respective configuration files 214. Such configuration files 214 may include a message configuration file 310a, which provides mappings between endpoint-specific messages for the respective endpoints and generalized messages. For example, by reading the message configuration file 310a, the DBLIB instance of each endpoint becomes configured to perform the desired translation.

At 730, an endpoint-specific message 240 of a first endpoint (e.g., EP1) is provided to a second endpoint (e.g., EP2) at least in part by (i) translating, by the common interface component (e.g., DBLIB) of the first endpoint EP1, the endpoint-specific message of the first endpoint to a set of generalized messages 250, (ii) providing the set of generalized messages 250 to the common interface component (e.g., DBLIB) of the second endpoint EP2, and (iii) translating, by the common interface component of the second endpoint, the set of generalized messages to a set of endpoint-specific messages of the second endpoint.

An improved technique has been described for communicating between multiple endpoints 102 of an electronic system 100. The technique includes providing a common interface component 120 for each endpoint 102. Each common interface component 120 is configured to translate between endpoint-specific messages (240 and 290) of a respective endpoint and generalized messages (250 and 280) that are not specific to any endpoint. Using this arrangement, any two endpoints can communicate via generalized messages, by translating endpoint-specific messages of a sender into generalized messages and by translating generalized messages into endpoint-specific messages of a receiver.

Additional Information

To assist the reader's understanding, the following definitions may apply to certain embodiments:

Messages—block of data as received or ready to be sent over to an external device/application. Data format is specific to each external component.

Endpoint—software component serving an input/output for Messages.

Database—software component used to store values of the data into a format purposely defined for easy translation.

Database Message—block of data used to be stored in the Database.

Endpoint (External) ICD—XML document providing a machine-readable definition for external Messages.

Database ICD—XML document providing a machine-readable definition for Database Messages.

Transformation primitive—software component semantically equivalent with a (optionally configurable) function call.

Transformation—an instantiation of a transformation primitive with on a given data type and (optional) hardcoded set of parameters.

Transformation chain—ordered list of Transformations whose in/out endpoints are connected to previous/next out/in endpoints.

Transformation file—configuration file defining how Transformation primitives are instantiated to form Transformations.

Chain File—configuration file associating each component of an input message to a component of an output message, and the transformation chain performing the data translation from one format to another.

Event—callback for one or more functions that happen when a certain input message has been received.

Event definition file—configuration file defining the callbacks for each incoming message.

Notification—call back used by a recipient of an event to notify the sender about processing completion.

Notification file—configuration file defining the Notifications for each message of interest For each external device/application an Endpoint is instantiated. The endpoint is configured with an Endpoint ICD which allows it to parse the incoming data and format the outgoing data. The Database ICD (which can be obtained from the Database itself) allows the endpoint to communicate with the Database. The Transformation File defines how incoming data is converted to outgoing data. The event files allow the Database to inform other endpoints of availability of data. The notification file (if needed) allows the endpoint to throttle sequences of messages at a rate that can be processed by slowest component.

Upon receipt of a new message from an external device, the following flow of operations takes place:

The Message data is delineated in data fields according to the Endpoint ICD.

For each Field in the incoming messages, the corresponding Transformation chain is invoked to transform the data according to rules from Transformation files.

The transformed data fields are assembled into one or more Database Messages and sent to be stored in the Database.

The corresponding Events associated with the incoming message are triggered. The Database propagates the events to all the other Endpoints which are subscribed for the Messages triggered by the event file.

Each Target endpoint receives the newly updated Database messages.

Each Target endpoint uses the Database ICD to split the incoming data in meaningful fields, uses the chains files to convert the data in the format appropriate for being sent outside, and uses the Endpoint ICD to build the outgoing message from the transformed fields. The message is sent (via the database server 110) toward each of the indented recipients.

Having described certain embodiments, numerous alternative embodiments or variations can be made. For example, although embodiments have been shown that include a database server 110 acting as an intermediary between a sending endpoint and any number of receiving endpoints, these are merely examples. Alternatively, the exchange of messages between endpoints can be direct. For example, a common interface component of a sender endpoint can send generalized messages directly to the common interface component of any number of receiver endpoints.

Further, although embodiments have been described that enable control over a UAV 140 in real time, this is also merely an example. Alternative embodiments may involve communication between any endpoints of an electronic system, regardless of whether the endpoints include a UAV or are controlled in real time.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 750 in FIG. 7). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of communicating between a plurality of heterogeneous endpoints of an electronic system, comprising:
   providing multiple common interface components including a respective common interface component for each of the plurality of heterogeneous endpoints, the common interface components being respective instances of a single software component that is duplicated across the plurality of heterogeneous endpoints;
   configuring each respective common interface component through a respective set of data of one or more configuration files to translate between endpoint-specific messages of the respective endpoint and generalized messages; and
   providing an endpoint-specific message of a first endpoint of the plurality of heterogeneous endpoints to a second endpoint of the plurality of heterogeneous endpoints at least in part by (i) translating, by the common interface component of the first endpoint, the endpoint-specific message of the first endpoint to a set of generalized messages, (ii) providing the set of generalized messages to the common interface component of the second endpoint, and (iii) translating, by the common interface component of the second endpoint, the set of generalized messages to a set of endpoint-specific messages of the second endpoint.

2. The method of claim 1, wherein configuring each common interface component includes:
   providing a respective set of configuration files for each of the common interface components; and
   reading the respective set of configuration files or portions thereof to adapt the respective common interface component for use with the respective endpoint.

3. The method of claim 2, wherein the set of configuration files for at least one of the plurality of endpoints specifies transformations between endpoint-specific messages of the respective endpoint and corresponding generalized messages.

4. The method of claim 2, wherein the set of configuration files for at least one of the plurality of endpoints defines a set of primitives configured to mathematically transform between fields of endpoint-specific messages of the respective endpoint and equivalent fields of the generalized messages.

5. The method of claim 4, wherein set of primitives includes:
   a linear transformation primitive;
   a quadratic transformation primitive;
   a logarithmic transformation primitive; and/or
   an exponential transformation primitive.

6. The method of claim 4, wherein the set of configuration files for at least one of the plurality of endpoints defines sequences of primitives to be performed in order and associated parameters to be applied to the primitives to effect transformations between the fields of endpoint-specific messages of the respective endpoint and equivalent fields of the generalized messages.

7. The method of claim 1, wherein providing the endpoint-specific message of the first endpoint to the second endpoint includes:
   sending, by the common interface component of the first endpoint, the set of generalized messages to a database server;
   storing, by the database server, the set of generalized messages in a database of the database server; and
   sending, by the database server, the set of generalized messages to the second endpoint.

8. The method of claim 7, wherein the database server operates in accordance with a publish/subscribe model, and wherein sending, by the database server, the set of generalized messages to the second endpoint is responsive to the common interface component of the second endpoint being a subscriber to the set of generalized messages.

9. The method of claim 8, wherein the first endpoint is configured to send a set of event descriptors to the database server when sending the set of generalized messages, the set of event descriptors identifying changes in one or more fields of the set of generalized messages, and wherein the method further comprises:
   accessing, by the database server, one or more data structures that associate event descriptors with endpoints that subscribe to the event descriptors;
   identifying the common interface component of the second endpoint as a subscriber to the set of event descriptors; and
   transmitting the changes in said one or more fields to the common interface component of the second endpoint.

10. The method of claim 9, wherein transmitting the changes in said one or more fields includes:
    notifying the common interface component of the second endpoint that the set of event descriptors has been received;
    receiving a request from the common interface component of the second endpoint to provide the changes in said one or more fields; and
    providing the changes in said one or more fields to the common interface component of the second endpoint.

11. The method of claim 1, wherein the first endpoint is located remotely from an aerial vehicle, wherein the second endpoint is located within the aerial vehicle, and wherein providing the endpoint-specific message of the first endpoint to the second endpoint includes sending a control command to the aerial vehicle for controlling operation of the aerial vehicle in real time.

12. The method of claim 1, wherein the endpoint-specific message of the first endpoint is different from the set of endpoint-specific messages of the second endpoint.

13. A method of controlling an aerial vehicle using an electronic system, comprising:
   translating, using a first common interface component, an endpoint-specific message of a first endpoint of the electronic system into a set of generalized messages, the first endpoint disposed outside the aerial vehicle;
   storing the set of generalized messages in a database; and
   sending the set of generalized messages from the database to a second endpoint of the electronic system, the second endpoint disposed within the aerial vehicle and controlling at least a portion of the aerial vehicle in real time responsive to the message, the first and second endpoints being heterogeneous endpoints,
   wherein the method further comprises translating, using a second common interface component, the set of generalized messages into one or more endpoint-specific messages of the second endpoint,
   wherein the first common interface component and the second common interface component are respective instances of a single software component that is duplicated across the first and second heterogeneous endpoints, and
   wherein the method further comprises configuring the first common interface component based on a set of data of one or more configuration files accessible by the first endpoint.

14. The method of claim 13, further comprising:
   configuring the second common interface component for use by the second endpoint based on a set of configuration files accessible by the second endpoint.

15. A computerized apparatus, comprising:
   control circuitry that includes a set of processors coupled to memory, the control circuitry constructed and arranged to
      provide multiple common interface components including a respective common interface component for each of a plurality of heterogeneous endpoints, the common interface components being respective instances of a single software component that is duplicated across the plurality of heterogeneous endpoints;
      configure each respective common interface component through a respective set of data of one or more configuration files to translate between endpoint-specific messages of the respective endpoint and generalized messages; and
      provide an endpoint-specific message of a first endpoint of the plurality of heterogeneous endpoints to a second endpoint of the plurality of heterogeneous endpoints at least in part by (i) translating, by the common interface component of the first endpoint, the endpoint-specific message of the first endpoint to a set of generalized messages, (ii) providing the set of generalized messages to the common interface component of the second endpoint, and (iii) translating, by the common interface component of the second endpoint, the set of generalized messages to a set of endpoint-specific messages of the second endpoint.

16. The computerized apparatus of claim 15, wherein the control circuitry constructed and arranged to configure each common interface component is further constructed and arranged to:
   provide a respective set of configuration files for each of the common interface components; and
   read the respective set of configuration files or portions thereof to adapt the respective common interface component for use with the respective endpoint.

17. The computerized apparatus of claim 16, wherein the set of configuration files for at least one of the plurality of endpoints specifies transformations between endpoint-specific messages of the respective endpoint and corresponding generalized messages.

18. The computerized apparatus of claim 16, wherein the set of configuration files for at least one of the plurality of endpoints is constructed and arranged to:
   define a set of primitives configured to mathematically transform between fields of endpoint-specific messages of the respective endpoint and equivalent fields of the generalized messages; and
   define sequences of primitives to be performed in order and associated parameters to be applied to the primitives to effect transformations between the fields of endpoint-specific messages of the respective endpoint and equivalent fields of the generalized messages.

19. The method of claim 7, wherein the database includes an in-memory key-value store that associates multiple keys based on message identifiers or field identifiers with associated values of messages or fields identified by the message identifiers or field identifiers.

\* \* \* \* \*